March 29, 1938.  L. LEITZ  2,112,701
EXPOSURE METER
Filed Jan. 22, 1936  3 Sheets-Sheet 1
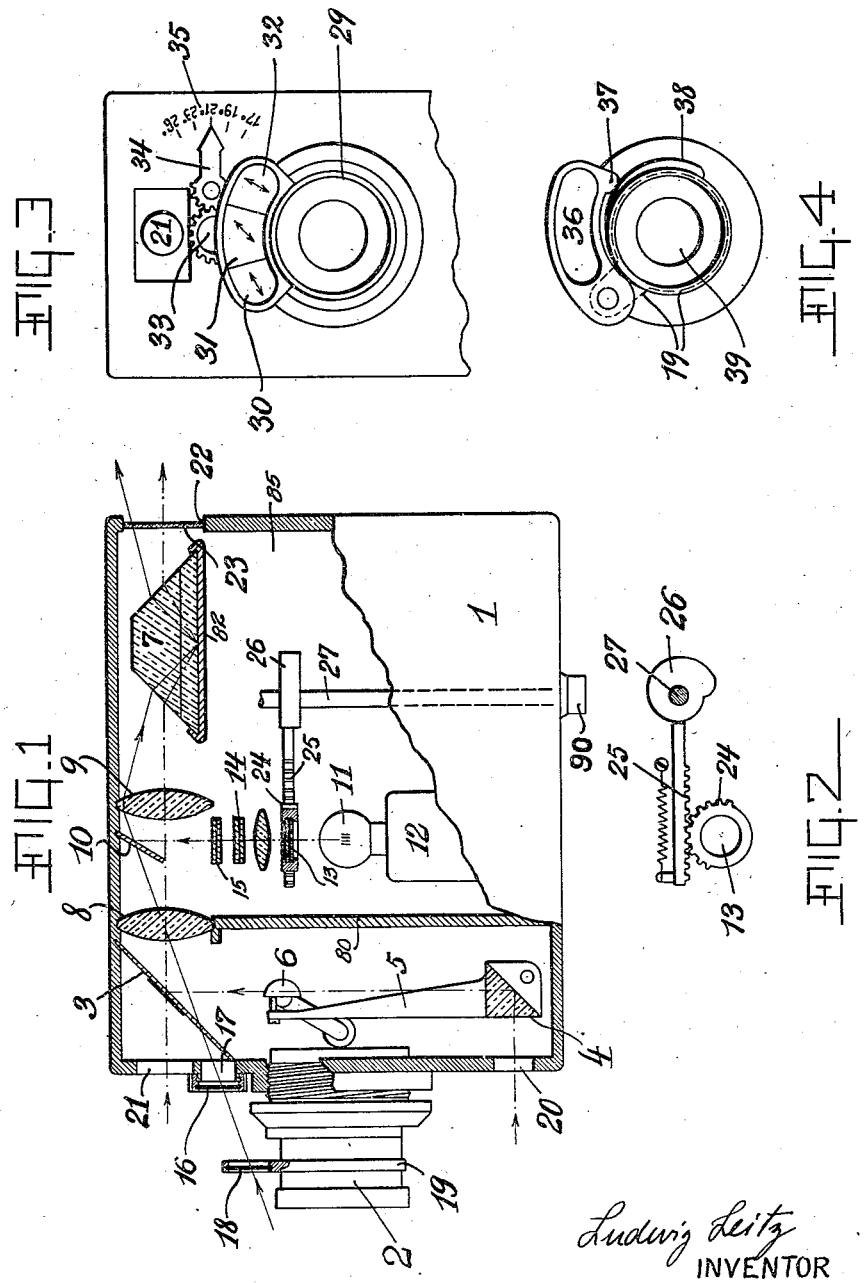
Ludwig Leitz
INVENTOR
BY Ivan E. A. Konigsberg
ATTORNEY March 29, 1938.      L. LEITZ      2,112,701
EXPOSURE METER
Filed Jan. 22, 1936      3 Sheets-Sheet 2
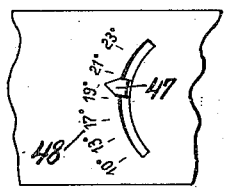
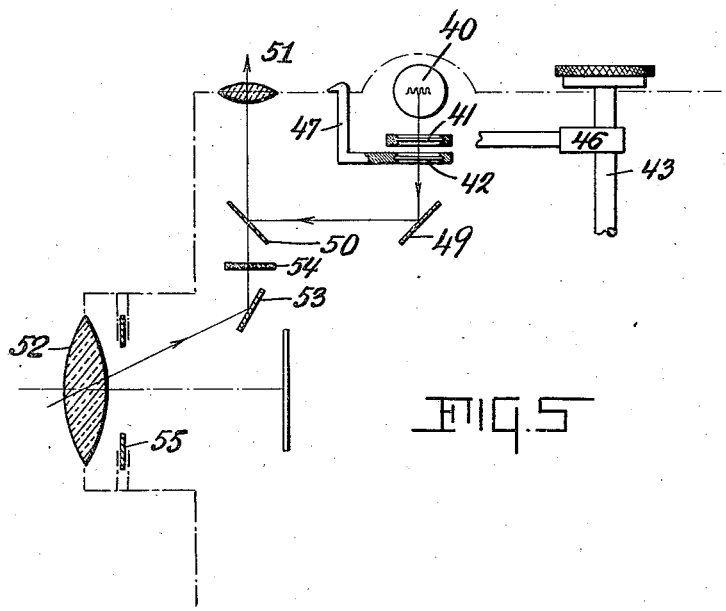
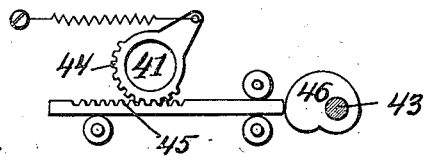

March 29, 1938. L. LEITZ 2,112,701
EXPOSURE METER
Filed Jan. 22, 1936 3 Sheets-Sheet 3

Ludwig Leitz
INVENTOR
BY Ivan E. A. Koenigsberg
ATTORNEY

Patented Mar. 29, 1938

2,112,701

UNITED STATES PATENT OFFICE 2,112,701

EXPOSURE METER

Ludwig Leitz, Wetzlar, Germany, assignor to Ernst Leitz, G. m. b. H., Wetzlar, Germany Application January 22, 1936, Serial No. 60,159
In Germany February 2, 1935

6 Claims. (Cl. 95—10)

This invention relates to improvements in exposure meters for photographic cameras and has particular reference to exposure meters which form an integral part of the camera and which include a source of artificial light as a constrasting measuring light element in the optical system of the camera.

The object of the invention is to provide a generally improved exposure meter of the character described including as a particularly novel and advantageous feature the use of polarization foils as light weakening and regulating elements. The polarization foils are preferably interposed in the bundle of light rays emanating from the artificial light source and also in the bundle of light rays from the camera objective. The polarization foils are capable of mutually opposed rotatable operation and may also function in combination with analyzer foils.

Another object of the invention is to provide means for automatically combining the operation of the polarizer foils with the operation of the shutter and the iris diaphragm of the camera whereby to harmonize or balance the weakening of the light, which is caused by the polarizer foils in the bundle of rays from the artificial light source, with the actinic or light values of the said two elements. This may be done by means of interposed mechanical elements, or one or more foils may consist of several units or parts, each having a direction of vibration in fixed differential relation to that of the other parts, the parts being operated successively in the bundle of rays from the artificial light source.

Another object of the invention is to operate light weakening polarizer foils in combination with a view finder and a range finder for the purpose of balancing the light intensity between the objective light and the artificial light, the foils being coupled to the iris diaphragm and the shutter as well as to other parts of the camera if desired. Still another object is to provide a single opening for observing the effect of the foils in the range finder and view finder system in combination with different eye positions with respect to said opening. Other objects will appear as this specification proceeds. Accordingly, the invention is embodied in a photographic camera which is provided with an exposure meter including polarizer foils, a range finder and a view finder and operating means arranged and constructed as hereinafter described and as illustrated in the accompanying drawings in which Fig. 1 is a view of a photographic camera embodying the invention, parts being in section and parts broken away, the illustration being largely diagrammatic with many constructional and mechanical details omitted.

Fig. 2 is a detail view illustrating one form of foil operating mechanism.

Fig. 3 is a front view of a camera, parts being broken away and illustrating a modification.

Fig. 4 is a detail view illustrating a still further modification.

Fig. 5 is a diagram illustrating another arrangement.

Figs. 6 and 7 are detail views of parts shown in Figure 5.

Figure 9:
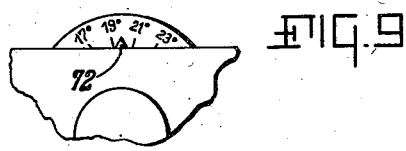
Figs. 9 and 10 are detail views of parts shown in Figure 8.

Referring to Figures 1 and 2 the numeral 1 designates a photographic camera having an objective 2, a range finder system including the fixed mirror 3, the movable prism 4 supported on the arm 5 which is operated in a known manner by a part 6 actuated by the objective. 7 designates the reversing prism of a view finder which also includes the oculars 8 and 9. The prism 7 is carried by a suitable support 82. Between said two oculars there is mounted a mirror 10 which is partly light transparent and partly reflecting.

The mirror 10 is fixed in a position to reflect the rays emanating from an electric lamp 11 having a dry battery 12. The light from the lamp 11 passes through a rotatable polarizer foil 13 into the analyzer foil 14 and then into the mirror 10. A second analyzer foil 15 may be mounted between the outer foil 14 and the mirror 10 and operated in connection with a Scheiner scale. As an alternative construction, not shown, the foil 15 may be mounted between the mirror 10 and an analyzer foil 16 which latter is supported in front of the light inlet opening 17. Still another polarizer foil 18 is supported on the objective so as to be exchangeable therewith. The foil 18 is operated from the iris diaphragm adjusting ring 19. The range finder light inlet opening is designated 20, the view finder light inlet opening is designated 21. The opening 22 with ground glass 23 constitutes a single observation opening for the exposure meter, the range finder and the view finder. The polarizer foil 13 is rotated by means of a gear 24 and rack 25, the latter being actuated from a cam 26 mounted on the shutter operating shaft 27 which is operated in the usual manner by a setting knob 90. A partition 80 or other suitable member serves to exclude the light from the lamp 11 from the light sensitive element in the camera, not shown. It will be understood without any further description that the several parts of the invention shown in Figure 1 will be suitably supported with relation to the wall 85 of the camera.

Figure 3 illustrates a modification in which the objective 29 carries a polarizing foil which consists of several single parts 30, 31 and 32 each having a fixed different direction of vibration from that of the other parts as indicated. The polarizer foil 33 which corresponds to the polarizer foil 16 in Figure 1 is operatively movably connected to a pointer 34 which registers with a Scheiner scale 35. The operative connection between the analyzer foil 15 and a Scheiner scale referred to above and which is not illustrated in Figure 1 may be embodied in a construction such as is shown in Figure 3 between the foil 33 and the pointer 34. Figure 4 illustrates another modification in which the polarization foil 36 is operated by the iris diaphragm ring 19 when the latter is adjusted by means of a nose 37 which moves on a cam 38 secured to the ring 19.

Let it be assumed that the photographer desires to ascertain the correct diaphragm opening to use with a predetermined shutter speed. The pointer 34 is then set to register with the degree mark on the Scheiner scale corresponding with the film to be used. This operation causes a rotation of the foil 33 in Figure 3 or the corresponding foil 16 in Figure 1. If, as stated above, the foil 15 in Figure 1 is connected to the Scheiner scale, then of course the foil 15 will be operated to weaken the light from the lamp. On the whole, the operation of the foil 15 is more advantageous because the brighter lamp light may be weakened much more than the weaker objective light. A predetermined shutter speed having been decided upon, the shutter shaft 27 is actuated to rotate the polarizer foil 13 into a predetermined position with respect to the fixed analyzer foil 15. The photographer then looks into the camera through the eye opening 22 and sees a small portion of the image surrounding the general view finder image beneath the latter and the light from the lamp will be seen in said small portion. The light from the lamp is reflected in infinity in the mirror 10. The reflected lamp light is now superimposed upon a certain selected dark or light detail of the image. Thereafter the iris diaphragm adjusting ring 19 is actuated until the artificial light disappears in the view finder, it being obvious that when the ring 19 is actuated, the position of the polarizer foil 18 is changed and thus the image from the objective seen through the foil 18 appears darker or lighter. The light from the lamp disappears from view in the view finder when the object light is equal to the lamp light. The parts are now in the correct position and the picture may be taken.

Of course, in operating the camera the photographer will shift his eye from the lower to the upper position indicated in the observation opening 22 so as to operate first the range finder and the view finder and thereafter, in the upper position, observe the reflected light from the lamp, i. e. the glowing filament. This will be understood by persons skilled in the art.

Of course one may operate the device to ascertain the shutter speed corresponding to a predetermined diaphragm opening. In this case the ring 19 is first operated to obtain a predetermined balanced position of the foils 18, respectively the foils 30 and 36 in Figures 3 and 4, with respect to the fixed analyzer foil 16 in the opening 17. Then the shaft 27 is operated until the foil 13 is brought into such a position that the objective light disappears.

Figure 5 is a diagram illustrating a modified arrangement showing only the optical elements involved. In this case the light from the lamp 40 passes through two foils 41 and 42. The foil 41 is a polarizer foil and is rotatably connected to the shutter setting shaft 43 by means of a gear 44, rack 45 and cam 46 in an obvious manner shown in Figure 7. The foil 42 functions as an analyzer foil and is connected to a pointer 47 which moves over a Scheiner scale 48, Figure 6. The light from the lamp 40 passes through the foils 41 and 42 into a reflecting mirror 49 and to the mirror 50, which is silvered over its entire surface and partly light transparent, then into the lens 51 where the lamp light is united with the objective light which comes from the objective 52 into a reflecting mirror 53, through a ground glass 54 and into the lens 51. 55 indicates the iris diaphragm.

Figure 8:
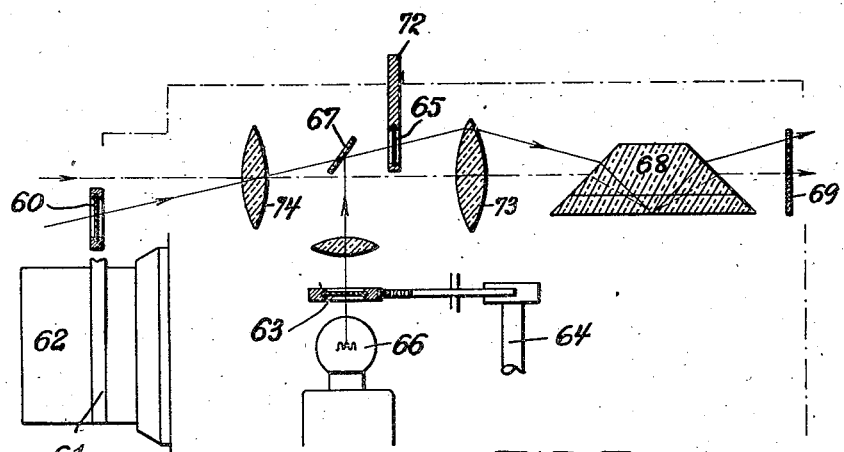
Fig. 8 is a diagrammatic view of a still further modified system.
Figure 10:
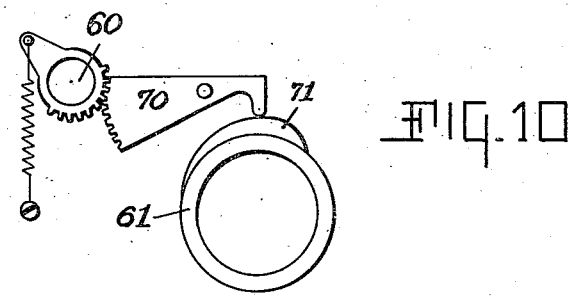

Figure 8 illustrates diagrammatically still another modification in which a polarizer foil 60 is operatively connected to the ring 61 which operates the iris diaphragm for the objective 62. 63 is a further polarizer foil rotatably connected to the shutter adjusting shaft 64 in a manner illustrated in Figure 2. 65 indicates an analyzer foil interposed in the bundle of light rays emanating from the lamp 66 and the objective foil 60, the rays from the lamp being reflected by the mirror 67, which is partly light transparent and partly reflecting, into the reversing view finder prism 68 and through the ground glass or filter 69. The connection between the objective foil 60 and the ring 61 may be accomplished by means of a lever 70 which is actuated by a cam 71 on the ring as shown in Figure 10. The analyzer foil 65 is connected to the Scheiner scale pointer 72. The lens system indicated by 68, 73 and 74 represents the view finder.

The system illustrated in Figures 5 to 7 operates as follows. If a film with 19° Scheiner be selected then the pointer 47 is adjusted accordingly, hence foil 42 is actuated. This results in a certain weakening of the light from the lamp 40. Let it then be assumed that a time exposure of 1/60 of a second has been determined upon. The shutter setting shaft 43 is then operated accordingly and the foil 41 rotated which also causes a certain weakening of the lamp light. By observation through the lens 51 one sees the light from the lamp appearing as a bright spot upon the ground glass 54 in the image from the objective 52. The iris diaphragm 55 is then opened until the lamp light is no longer seen. Then the picture is taken.

It will be understood of course that the illustrations are largely diagrammatic for the purpose of illustrating the principle of the invention rather than constructional details. Also that the invention is susceptible of being embodied in arrangements and systems other than those illustrated and described. I accordingly claim all such modifications as come within the principle of the invention and of the scope of the appended claims.

I claim:

1. In a photographic camera having shutter diaphragm adjusting means, a shutter speed indicating shaft and a view finder system, an exposure meter within said camera including an electric lamp as a light contrasting measuring element, a polarizing foil and an analyzing foil in the path of the light rays from said electric lamp, means operatively connected to the said shaft for effecting relative adjustment between the polarizing and analyzing foils, an opening for admitting light rays from the object into the camera, a polarizing foil and an analyzing foil in the path of the object light rays, means operatively connected to the said diaphragm adjusting means for effecting relative adjustment between said last named polarizing and analyzing foils, means for reflecting the light rays from the lamp and the object into the said view finder system and means in the latter for comparing the intensities of the said two bundles of light rays.

2. In a photographic camera having shutter diaphragm adjusting means, a shutter speed indicating shaft and a view finder system, an exposure meter within said camera including an electric lamp as a light contrasting measuring element, polarization foils in the path of the light rays from said lamp, means operatively connected to the said shaft for rotating at least one of said polarization foils to vary the intensity of the light rays from the lamp, an opening in said camera for admitting light rays from the object into the camera, other polarization foils in the path of the object light rays, means operatively connected to the diaphragm adjusting means for rotating at least one of said other polarization foils to vary the intensity of the object light rays, a mirror for reflecting the latter and the rays from the lamp into the said view finder system and a single eye opening in said system for observing and comparing the intensities of the said two bundles of light rays.

3. In a photographic camera having shutter diaphragm adjusting means, a shutter speed indicating shaft, a view finder and a range finder, an opening for admitting light rays from the object into the camera, means for reflecting the image from the range finder into the optical system of the view finder, an electric lamp in said camera, a mirror for reflecting the lamp light rays and the object light rays into the optical system of the view finder, a plurality of polarization foils in the paths of the said two bundles of light rays, means coupled to the said diaphragm adjusting means for operating the polarization foils in the object bundle of light rays to vary the intensity thereof, means coupled to the said shaft for operating the polarization foils in the light rays from the lamp to vary the intensity thereof, and means in said view finder including a single eye opening for observing the images in the said two finders and for comparing the intensities of the said two reflected polarized bundles of light rays.

4. An exposure meter according to claim 2 characterized by that at least one of the polarization foils consists of a plurality of portions each of which have a fixed direction of vibration different from the fixed directions of vibrations of the other portions.

5. An exposure meter according to claim 2 characterized by that the one polarization foil which is rotated by the diaphragm adjusting means is exchangeable with the objective of the camera and consists of a plurality of portions each of which have a fixed direction of vibration different from the fixed directions of vibrations of the other portions.

6. An exposure meter according to claim 2 characterized by that the polarization foils in the path of the artificial light rays are located within the camera and the polarization foils in the path of the object light rays are located upon the outside of the camera.

LUDWIG LEITZ.